United States Patent
Honda

(10) Patent No.: US 8,452,127 B2
(45) Date of Patent: May 28, 2013

(54) METHODS AND APPARATUSES FOR REDUCING THE EFFECTS OF NOISE IN IMAGE SIGNALS

(75) Inventor: Yoshiaki Honda, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 354 days.

(21) Appl. No.: 12/901,380

(22) Filed: Oct. 8, 2010

(65) Prior Publication Data

US 2011/0085052 A1    Apr. 14, 2011

(30) Foreign Application Priority Data

Oct. 13, 2009  (WO) .................. PCT/JP2009/067741

(51) Int. Cl.
*G06K 9/32* (2006.01)
*G06K 9/00* (2006.01)
*G06K 9/34* (2006.01)

(52) U.S. Cl.
USPC .......................................... 382/300; 382/167

(58) Field of Classification Search
USPC ......... 382/162, 164, 167, 173, 254, 260–264, 382/272, 275, 300; 348/222.1, 266, 272, 348/273, 280
See application file for complete search history.

(56) References Cited

U.S. PATENT DOCUMENTS

| | | | |
|---|---|---|---|
| 6,388,706 B1 * | 5/2002 | Takizawa et al. | 348/273 |
| 6,456,325 B1 | 9/2002 | Hayashi | |
| 6,621,937 B1 * | 9/2003 | Adams et al. | 382/275 |
| 6,930,711 B2 | 8/2005 | Fukui et al. | |
| 6,975,354 B2 * | 12/2005 | Glotzbach et al. | 348/273 |
| 7,034,869 B2 * | 4/2006 | Sugimori | 348/222.1 |
| 7,889,252 B2 * | 2/2011 | Tamura et al. | 348/272 |
| 2002/0140828 A1 | 10/2002 | Fukui et al. | |
| 2011/0085052 A1 * | 4/2011 | Honda | 348/223.1 |

FOREIGN PATENT DOCUMENTS

| | | |
|---|---|---|
| JP | 8-023541 A | 1/1996 |
| JP | 10-341447 A | 12/1998 |
| JP | 2002-300590 A | 10/2002 |
| JP | 2007-336384 A | 12/2007 |
| JP | 2008-072377 A | 3/2008 |
| JP | 2009-021962 A | 1/2009 |
| JP | 2009-027537 A | 2/2009 |
| WO | 2009011308 A1 | 1/2009 |

* cited by examiner

*Primary Examiner* — Amir Alavi
(74) *Attorney, Agent, or Firm* — Carter, DeLuca, Farrell & Schmidt LLP

(57) ABSTRACT

An object is to suppress a false color and moire that occur in a high-frequency region. Color interpolation circuits of a color-difference signal generating circuit separate an image signal obtained from an image pickup device, in which a plurality of color filters are arranged in a predetermined pattern and in which pixels corresponding to the respective color filters are provided, into image signals of the respective color filters (R, G1, G2, and B), and perform an interpolation process on the image signals of the respective color filters. Then, a false color determining circuit determines whether a target region is a high-frequency region on the basis of at least any of slopes of image signals of the G1 filter and the G2 filter and a difference between the image signals of the G1 filter and the G2 filter in the target region.

17 Claims, 15 Drawing Sheets

FIG. 2

| P1 | | P2 | | P3 | |
|---|---|---|---|---|---|
| | R | | G1 | | R |
| P4 | | P5 | | P6 | |
| | G2 | | B | | G2 |
| P7 | | P8 | | P9 | |
| | R | | G1 | | R |

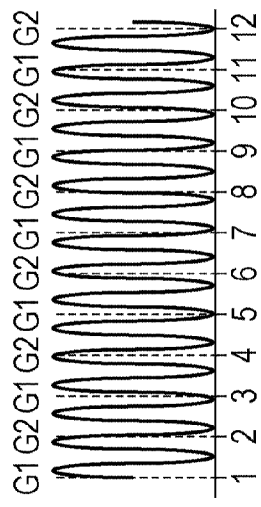
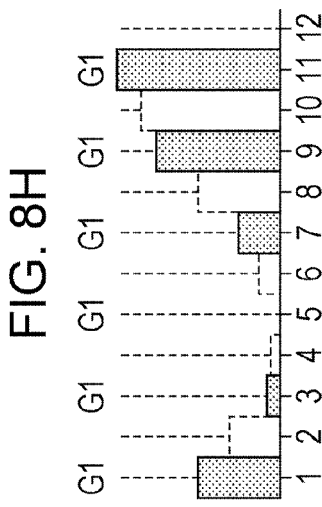
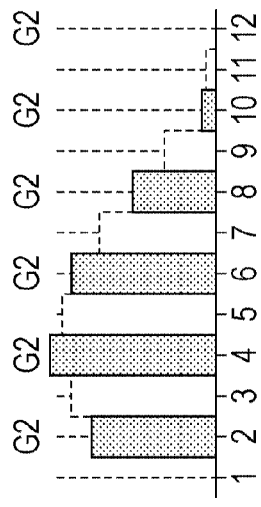
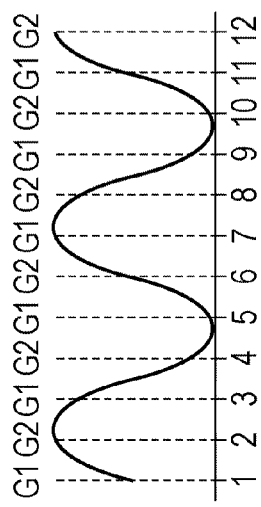
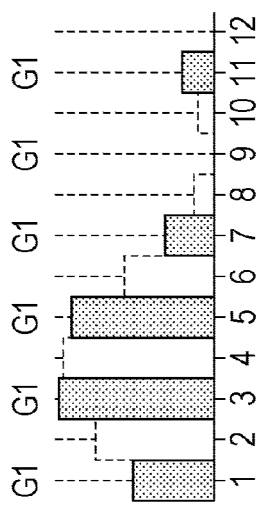
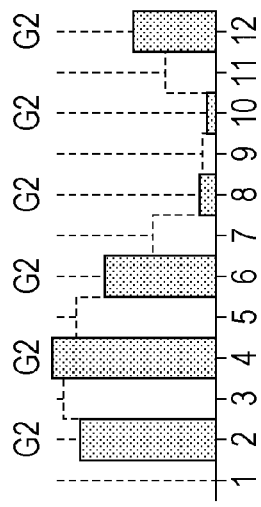
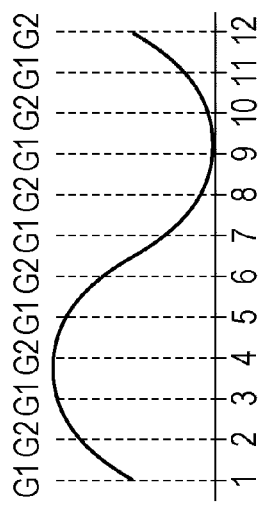
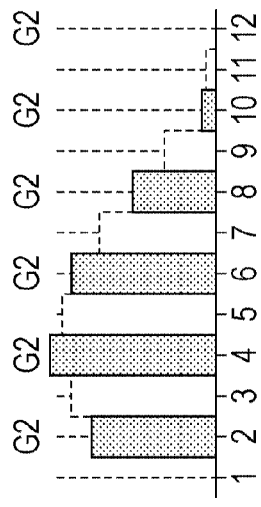

FIG. 16

| R | G1 |
|---|----|
| G2 | B |

METHODS AND APPARATUSES FOR REDUCING THE EFFECTS OF NOISE IN IMAGE SIGNALS

TECHNICAL FIELD

The present invention generally relates to image processing and, more particularly, to an image processing apparatus capable of reducing effects of noise in a high-frequency region.

BACKGROUND ART

Conventionally, as a method for suppressing a false color that occurs in a high-frequency region of a subject, color interpolation has been performed on a target pixel by using surrounding pixels of the target pixel.

Referring to FIG. 16, a description will be given of an example of a process of performing color interpolation on image signals that have been output from pixels in a Bayer pattern in which red (R), green (G), and blue (B) filters are arranged.

In FIG. 16, the G filter positioned in the horizontal direction with respect to the R filter and in the vertical direction with respect to the B filter is called a G1 filter, and the G filter positioned in the vertical direction with respect to the R filter and in the horizontal direction with respect to the B filter is called a G2 filter. Also, the signals output from the pixels corresponding to the G1, G2, R, and B filters are represented by G1sig, G2sig, Rsig, and Bsig, respectively.

This image processing apparatus separates an image signal into an image signal constituted by G1sig, an image signal constituted by G2sig, an image signal constituted by Rsig, and an image signal constituted by Bsig, and performs an interpolation process so that all the pixels have a signal in image signals of the respective colors.

Then, the image processing apparatus obtains a correlation of values of G1sig or G2sig of pixels that are vertically adjacent to a target pixel of color interpolation and a correlation of values of G1sig or G2sig of pixels that are horizontally adjacent to the target pixel. If the correlation in the horizontal direction is higher than the correlation in the vertical direction, the image processing apparatus regards the value of Rsig–G1sig as a color-difference signal R–G, and regards the value of Bsig–G2sig as a color-difference signal B–G. In contrast, if the correlation in the vertical direction is higher than the correlation in the horizontal direction, the image processing apparatus regards the value of Rsig–G2sig as a color-difference signal R–G, and regards the value of Bsig–G1sig as a color-difference signal B–G as described in Japanese Patent Laid-Open No. 2002-300590.

Alternatively, the image processing apparatus regards an average value of the value of Rsig–G1sig and the value of Rsig–G2sig as a color-difference signal R–G by using a weighting coefficient corresponding to the difference between the value of Rsig–G1sig and the value of Rsig–G2sig. Likewise, the image processing apparatus regards an average value of the value of Bsig–G1sig and the value of Bsig–G2sig as a color-difference signal B–G by using a weighting coefficient corresponding to the difference between the value of Bsig–G1sig and the value of Bsig–G2sig as described in Japanese Patent Laid-Open No. 08-023541.

In this way, a process of reducing a false color has been performed by generating color-difference signals by adaptively selecting pixels to be used for color interpolation.

Also, when luminance signals are to be generated, image signals are generated by adaptively selecting pixels to be used for interpolation in accordance with a correlation of pixels positioned in the horizontal direction and the vertical direction with respect to a target pixel, whereby a process is performed while suppressing moire and preventing unnaturalness in an entire image as described in Japanese Patent Laid-Open No. 2007-336384.

However, even in the above-described process, correlations in the horizontal direction and the vertical direction are not correctly obtained in a region containing an image signal approximate to a Nyquist frequency or an image signal containing aliasing noise, so that a false color or moire may remain. Therefore, it is considered that there is room for improvement for further reducing a false color or moire.

SUMMARY OF INVENTION

In order to solve the above-described problem, an image processing apparatus according to the present invention includes an interpolation unit configured to separate an image signal obtained from an image pickup device, in which a plurality of color filters are arranged in a predetermined pattern and in which pixels corresponding to the respective color filters are provided, into image signals of the respective color filters, and to perform an interpolation process by using the image signals of the respective color filters, and a determination unit configured to determine whether a target region is a high-frequency region on the basis of at least any of slopes of image signals of a first color filter and a second color filter among the plurality of color filters and a difference between the image signals of the first color filter and the second color filter in the target region. Pixels corresponding to the first color filter and the second color filter are arranged with an identical period and with a spatial phase difference.

Further features of the present invention will become apparent from the following description of exemplary embodiments with reference to the attached drawings.

BRIEF DESCRIPTION OF DRAWINGS

FIG. 2 is a diagram illustrating a partial region composed of 3×3 pixels in an image pickup device constituted in a Bayer pattern.

FIGS. 8A to 8I are diagrams illustrating values of G1sig and G2sig in image signals obtained by capturing a subject.

FIG. 16 is a diagram illustrating a Bayer pattern.

DESCRIPTION OF EMBODIMENTS

Hereinafter, embodiments of the present invention will be described in detail with reference to the drawings.

First Embodiment

Figure 1:
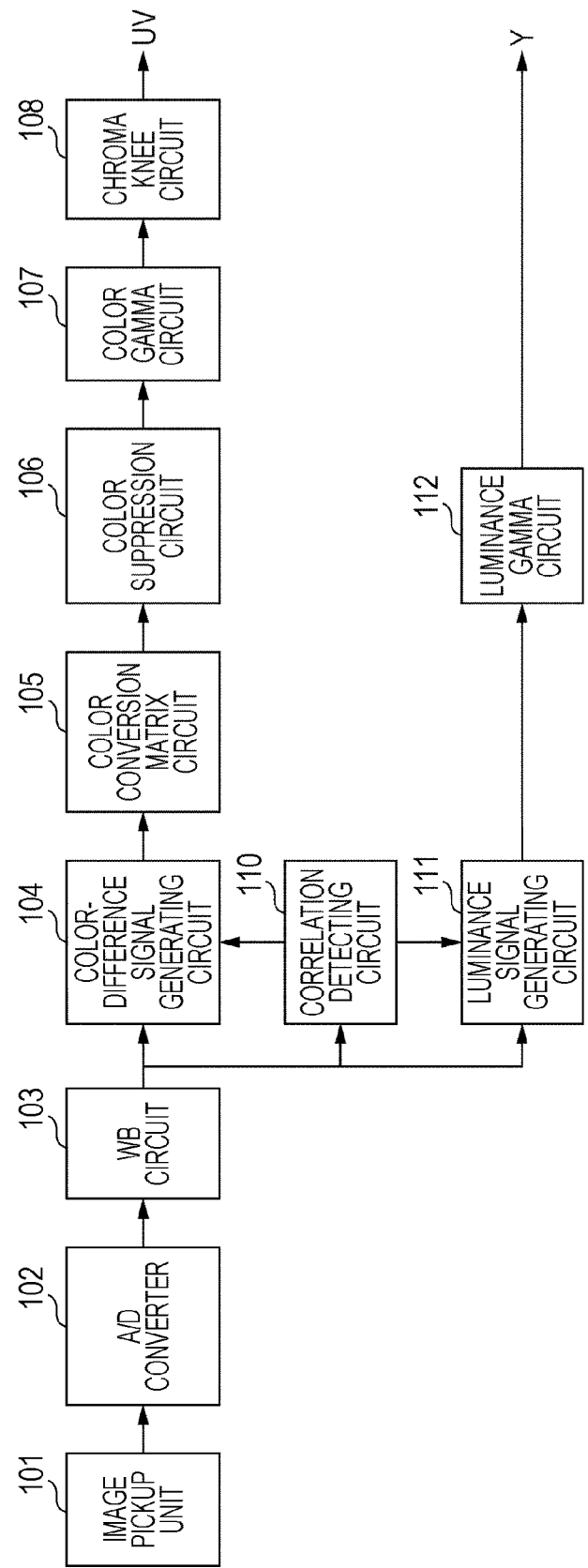
FIG. 1 is a block diagram illustrating a configuration of an image processing apparatus according to a first embodiment of the present invention.

FIG. 1 is a block diagram illustrating a configuration of an image processing apparatus according to a first embodiment of the present invention.

An image pickup unit 101 includes an image taking lens, an image pickup device, and a drive circuit therefor, which are not illustrated, and converts an optical image formed by the image taking lens into an electric signal using the image pickup device. The image pickup device includes a charge-coupled device (CCD) or a complementary metal-oxide semiconductor (CMOS) sensor, and is constituted by a set of pixels in a Bayer pattern illustrated in FIG. 16.

An analog signal output from the image pickup unit 101 is converted into a digital signal by an A/D converter 102. A white balance (WB) circuit 103 performs known white balance adjustment on the image signal that has been converted into a digital signal by the A/D converter 102.

The image signal output from the white balance circuit 103 is input to a color-difference signal generating circuit 104, a correlation detecting circuit 110, and a luminance signal generating circuit 111. The correlation detecting circuit 110 detects, from the image signal, correlations of signals in the vertical direction and the horizontal direction in units of pixels or regions. Luminance signal processing is performed on the image signal output from the white balance circuit 103 by an output of the correlation detecting circuit 110, the luminance signal generating circuit 111, and a luminance gamma circuit 112, so that luminance signals Y are output in units of pixels or regions.

The color-difference signal generating circuit 104 generates color-difference signals R−G and B−G in units of pixels or regions from the image signal input thereto and outputs the color-difference signals. The color-difference signals R−G and B−G output from the color-difference signal generating circuit 104 are converted into color-difference signals R−Y and B−Y, respectively, by a color conversion matrix circuit 105. After that, color-difference gains of high luminance and low luminance are suppressed by a color suppression circuit 106. An output signal from the color suppression circuit 106 passes through a known color gamma circuit 107 and a known chroma knee circuit 108 that adjusts chroma gain, so that color-difference signals UV are output in units of pixels or regions.

Figure 2:
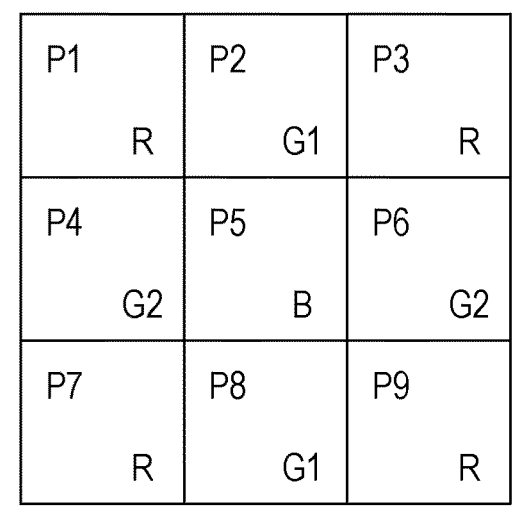

Now, a description will be given of a luminance interpolation process performed by the luminance signal generating circuit 111. FIG. 2 illustrates a partial region composed of 3×3 pixels in the image pickup device constituted in the Bayer pattern illustrated in FIG. 16. In this luminance interpolation process, a signal G1sig output from a pixel corresponding to a G1 filter and a signal G2sig output from a pixel corresponding to a G2 filter are not distinguished from each other, and both the signals are handled as Gsig.

First, the luminance signal generating circuit 111 interpolates Gsig to all the pixels corresponding to the filters except the G filters (G1 filters and G2 filters), that is, the pixels corresponding to the R filters and B filters. For example, P1 to P9 in FIG. 2 are reference symbols for identifying the pixels, and R, G1, G2, and B represent the color filters corresponding to the respective pixels P1 to P9. "P5 (Rsig)" represents the value of Rsig in the pixel P5, "P5 (Gsig)" represents the value of Gsig in the pixel P5, and "P5 (Bsig)" represents the value of Bsig in the pixel P5.

In the case of interpolating Gsig to the pixel P5 corresponding to the B filter, correlations of signals in the vertical and horizontal directions are detected to determine the direction of higher correlation. That is, the absolute value of the difference between signals of pixels positioned above and below the pixel as an interpolation target, and the absolute value of the difference between signals of pixels positioned to the right and left of the pixel as the interpolation target are obtained.

$$H\text{diff} = |P4(G\text{sig}) - P6(G\text{sig})| \tag{1}$$

$$V\text{diff} = |P2(G\text{sig}) - P8(G\text{sig})| \tag{2}$$

Then, the difference between Hdiff and Vdiff is regarded as an interpolation direction determination signal MatSw.

$$Mat Sw = H\text{diff} - V\text{diff} \tag{3}$$

When MatSW is negative, the correlation in the horizontal direction is stronger, so that interpolation is performed by using pixel signals in the horizontal direction. That is, an average value of Gsig of the pixel P4 and Gsig of the pixel P6 is regarded as Gsig of the pixel P5. On the other hand, when the difference is positive, interpolation is performed by using pixel signals in the vertical direction. That is, an average value of Gsig of the pixel P2 and Gsig of the pixel P8 is regarded as Gsig of the pixel P5. Interpolation of Gsig is performed on all the pixels corresponding to the R filters and B filters in a similar manner.

Next, interpolation of Rsig is performed on all the pixels corresponding to the G filters and B filters by using the interpolated Gsig. Interpolation of Rsig is performed on the pixels corresponding to the G filters (P2, P4, P6, and P8) by using Rsig of the pixels corresponding to the R filters positioned to the right and left or above and below, and Gsig obtained through interpolation performed on those pixels. Also, interpolation is performed on the pixels corresponding to the B filters by using Rsig of the pixels corresponding to the R filters positioned around the pixel, and Gsig obtained through interpolation performed on those pixels in accordance with the following expressions.

$$P2(R\text{sig}) = ((P1(R\text{sig}) - P1(G\text{sig})) + (P3(R\text{sig}) - P3(G\text{sig})))/2 + P2(G\text{sig}) \tag{4}$$

$$P4(R\text{sig}) = ((P1(R\text{sig}) - P1(G\text{sig})) + (P7(R\text{sig}) - P7(G\text{sig})))/2 + P4(G\text{sig}) \tag{5}$$

$$P5(R\text{sig}) = ((P1(R\text{sig}) - P1(G\text{sig})) + (P3(R\text{sig}) - P3(G\text{sig})) + (P7(R\text{sig}) - P7(G\text{sig})) + (P9(R\text{sig}) - P9(G\text{sig})))/4 + P5(G\text{sig}) \tag{6}$$

Likewise, interpolation of Bsig can be performed on all the pixels corresponding to the G filters and R filters. Accordingly, Rsig, Gsig, and Bsig are obtained in each pixel. Furthermore, a luminance signal Y can be obtained by performing calculation using the following expression (7) in each pixel.

$$Y = 0.3 \times R\text{sig} + 0.59 \times G\text{sig} + 0.11 \times B\text{sig} \qquad (7)$$

Note that the coefficient in each term of expression (7) can be changed as necessary.

Figure 3:
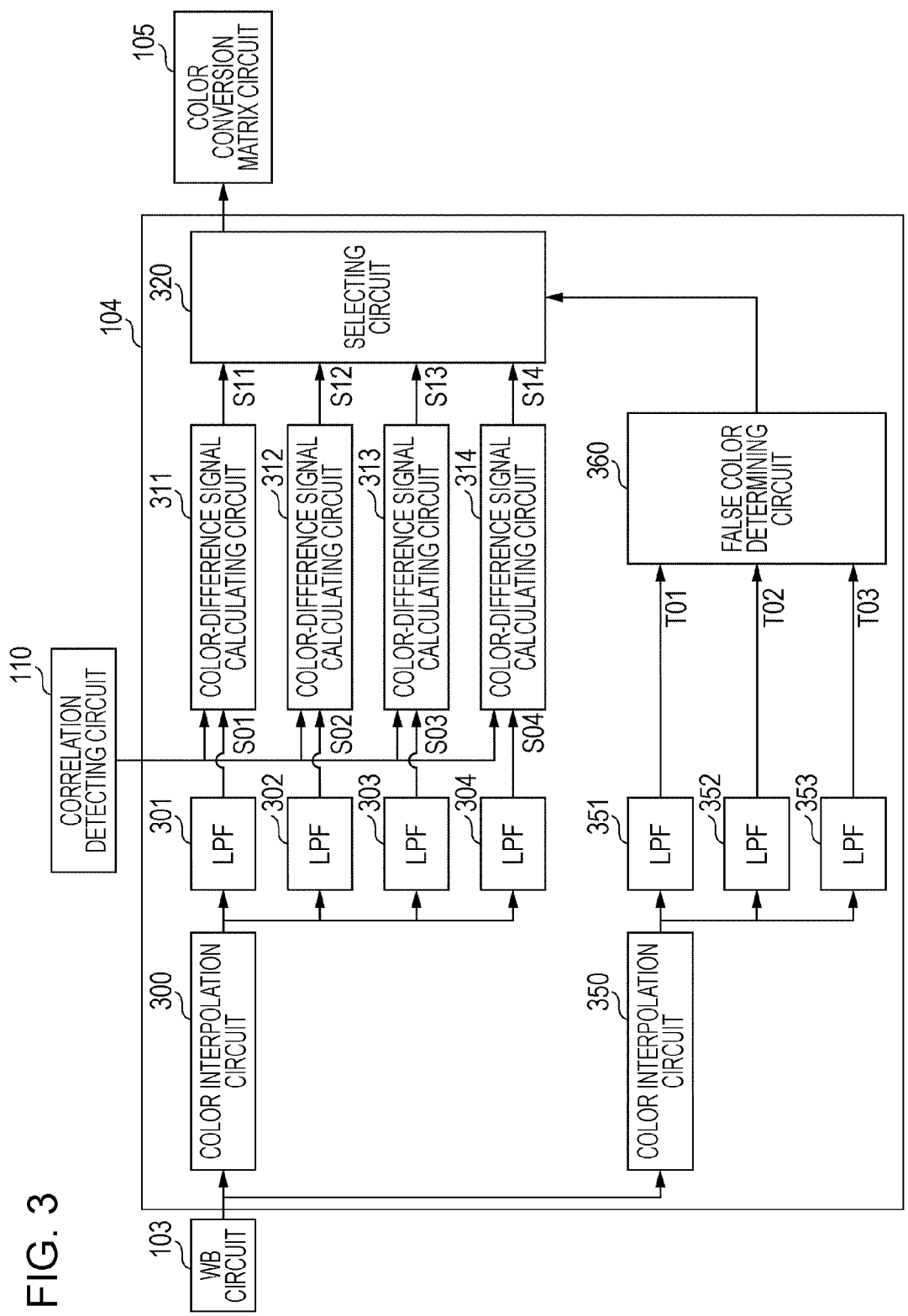
FIG. 3 is a block diagram illustrating a configuration of a color-difference signal generating circuit 104 according to the first embodiment of the present invention.

Next, a description will be given of a color interpolation process performed in the color-difference signal generating circuit 104. FIG. 3 is a block diagram illustrating a configuration of the color-difference signal generating circuit 104. The color-difference signal generating circuit 104 includes color interpolation circuits 300 and 350, low-pass filters (LPFs) 301 to 304 and 351 to 353, color-difference signal calculating circuits 311 to 314, a selecting circuit 320, and a false color determining circuit 360.

Figure 4:
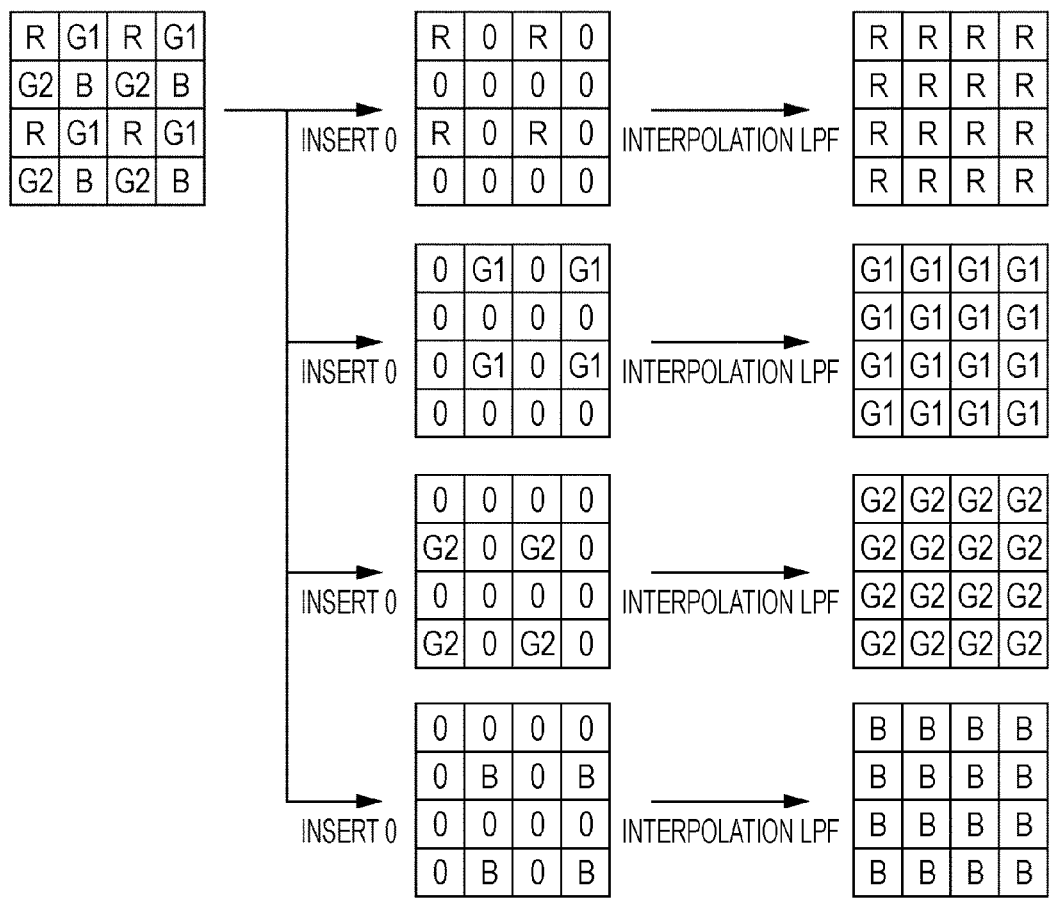
FIG. 4 is a diagram for explaining a process performed by a color interpolation circuit 300.

An image signal output from the white balance circuit 103 is input to the color interpolation circuit 300. FIG. 4 is a diagram for explaining an interpolation process performed by the color interpolation circuit 300. As illustrated in FIG. 4, the color interpolation circuit 300 decomposes an image signal input in a Bayer pattern into image signals composed of signals corresponding to respective colors of the R, G1, G2, and B filters. At this time, a signal value of zero is inserted into a pixel that does not correspond to a decomposed color filter.

After that, the color interpolation circuit 300 performs an interpolation process with LPFs using known digital filters, and outputs image signals of respective colors R, G1, G2, and B in which all the pixels have a signal.

Figure 6A:
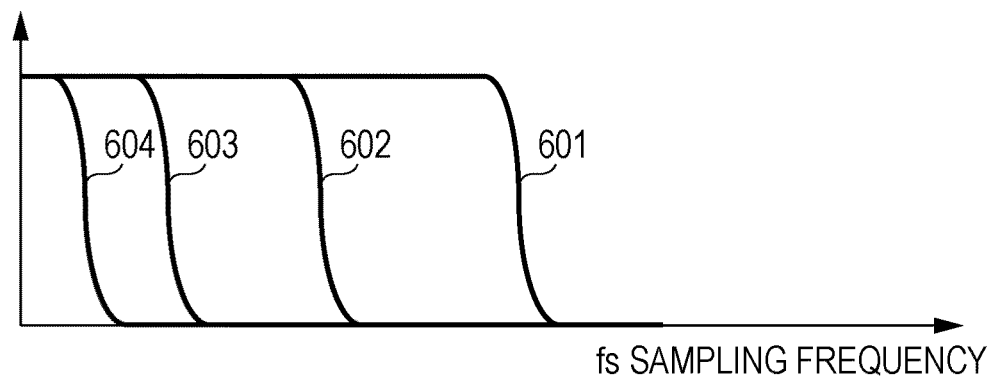
FIGS. 6A and 6B are diagrams illustrating an example of frequency characteristics of LPFs 301 to 304 and LPFs 351 to 353.

The image signals of the respective colors output from the color interpolation circuit 300 are input to the LPFs 301 to 304 having different cutoff frequencies. FIG. 6A illustrates an example of frequency characteristics of the LPFs 301 to 304. The LPF 301 has a frequency characteristic 601 in FIG. 6A, the LPF 302 has a frequency characteristic 602 in FIG. 6A, the LPF 303 has a frequency characteristic 603 in FIG. 6A, and the LPF 304 has a frequency characteristic 604 in FIG. 6A. As can be understood from FIG. 6A, the cutoff frequency increases in the order of the LPF 301, the LPF 302, the LPF 303, and the LPF 304. That is, a higher-frequency component is contained in an image in the order of an image signal S01 output from the LPF 301, an image signal S02 output from the LPF 302, an image signal S03 output from the LPF 303, and an image signal S04 output from the LPF 304. Each of the image signals S01 to S04 has image signals of the respective colors R, G1, G2, and B in which a frequency component is limited.

The image signal S01 is input to the color-difference signal calculating circuit 311, the image signal S02 is input to the color-difference signal calculating circuit 312, the image signal S03 is input to the color-difference signal calculating circuit 313, and the image signal S04 is input to the color-difference signal calculating circuit 314. The color-difference signal calculating circuits 311 to 314 calculate color-difference signals with respect to the image signals S01 to S04 by using the above-described method.

That is, the color-difference signal calculating circuit 311 refers to the correlations in the horizontal direction and the vertical direction in a target pixel obtained by the correlation detecting circuit 110, thereby generating color-difference signals R–G and B–G. Specifically, if the correlation detecting circuit 110 determines that the correlation in the horizontal direction is higher than the correlation in the vertical direction, the color-difference signal calculating circuit 311 regards the value of Rsig–G1sig as a color-difference signal R–G and regards the value of Bsig–G2sig as a color-difference signal B–G. On the other hand, if the correlation detecting circuit 110 determines that the correlation in the vertical direction is higher than the correlation in the horizontal direction, the color-difference signal calculating circuit 311 regards the value of Rsig–G2sig as a color-difference signal R–G and regards the value of Bsig–G1sig as a color-difference signal B–G.

Alternatively, the color-difference signal calculating circuit 311 regards an average value of the value of Rsig–G1sig and the value of Rsig–G2sig as a color-difference signal R–G by using a weighting coefficient corresponding to the difference between the value of Rsig–G1sig and the value of Rsig–G2sig. Likewise, the color-difference signal calculating circuit 311 regards an average value of the value of Bsig–G1sig and the value of Bsig–G2sig as a color-difference signal B–G by using a weighting coefficient corresponding to the difference between the value of Bsig–G1sig and the value of Bsig–G2sig.

The above-described process is also performed in the color-difference signal calculating circuits 312 to 314.

The color-difference signals R–G and B–G calculated by the color-difference signal calculating circuits 311 to 314 are input as color-difference signals S11, S12, S13, and S14 to the selecting circuit 320, which will be described below.

Next, a false color determination operation will be described. Image data output from the white balance circuit 103 is input to the color interpolation circuit 350. Like the color interpolation circuit 300, the color interpolation circuit 350 outputs image signals of respective colors R, G1, G2, and B in which all the pixels have a signal.

Figure 16:
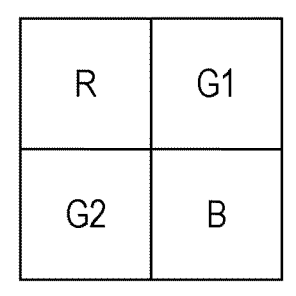

In the Bayer pattern illustrated in FIG. 16, the number of pixels corresponding to a G filter is twice the number of pixels corresponding to an R filter or the number of pixels corresponding to a B filter. By decomposing the G filter into a G1 filter and a G2 filter, pixel intervals (sampling intervals) of R, G1, G2, and B filters become equal to each other. Therefore, by detecting a region where aliasing noise occurs by using image signals of G1 and G2, a region where aliasing noise occurs in image signals of R and B can be specified.

Figure 6B:
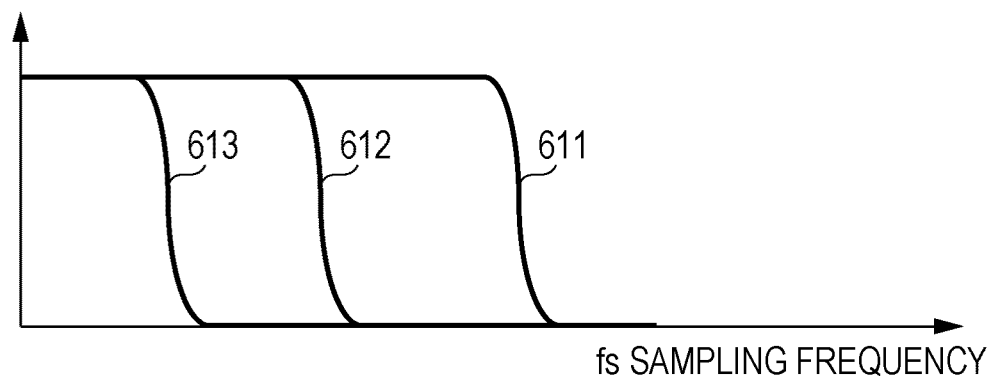

The image signals of the respective colors output from the color interpolation circuit 350 are input to the LPFs 351 to 353 having different cutoff frequencies. FIG. 6B illustrates an example of frequency characteristics of the LPFs 351 to 353. The LPF 351 has a frequency characteristic 611 in FIG. 6B, the LPF 352 has a frequency characteristic 612 in FIG. 6B, and the LPF 353 has a frequency characteristic 613 in FIG. 6B. As can be understood from FIG. 6B, the cutoff frequency increases in the order of the LPF 351, the LPF 352, and the LPF 353. That is, a higher-frequency component is contained in an image in the order of an image signal T01 output from the LPF 351, an image signal T02 output from the LPF 352, and an image signal T03 output from the LPF 353. In this embodiment, the frequency characteristic of the LPF 301 corresponds to that of the LPF 351, the frequency characteristic of the LPF 302 corresponds to that of the LPF 352, and the frequency characteristic of the LPF 303 corresponds to that of the LPF 353.

The image signals T01 to T03 output from the LPFs 351 to 353 are input to the false color determining circuit 360.

Figure 7:
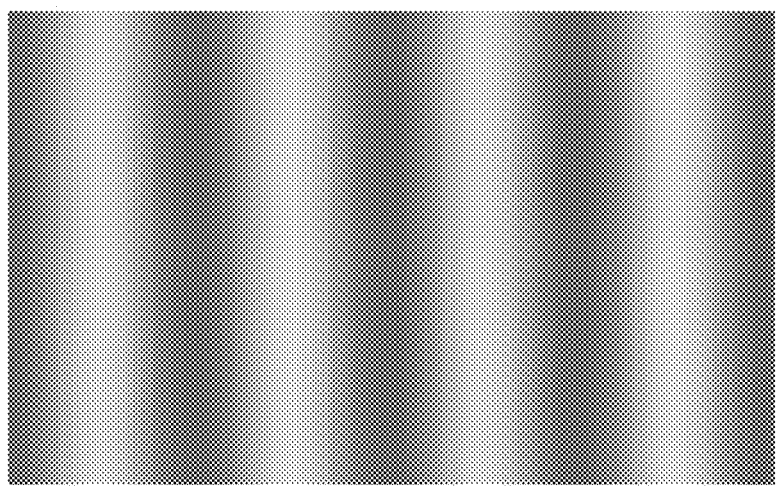
FIG. 7 is a diagram illustrating a subject of vertical stripes with gradation.

Now, a method for determining a region where a false-color signal occurs by the false color determining circuit 360 will be described with reference to FIGS. 7 and 8A to 8I. FIG. 7 illustrates a subject of vertical stripes with gradation. FIGS.

8A to 8I illustrate the values of G1sig and G2sig in image signals obtained by capturing an image of the subject in FIG. 7.

In FIGS. 8A to 8I, the horizontal axis indicates the position of a pixel in the horizontal direction. In FIGS. 8A, 8D, and 8G, G1sig obtained from the pixels corresponding to the G1 filters in a certain row and G2sig obtained from the pixels corresponding to the G2 filters in another row are arranged side by side. In the horizontal direction and the vertical direction, the sampling intervals of the pixels corresponding to the G1 filters and the sampling intervals of the pixels corresponding to the G2 filters are equal to each other, and special phases of the pixels corresponding to the G1 filters and the pixels corresponding to the G2 filters are shifted by half of the sampling intervals.

Since the subject in FIG. 7 is vertical stripes, a subject image equally enters all the rows. Thus, when the G1sig and G2sig are arranged in accordance with the positions of pixels in the horizontal direction, an image signal representing the gradation of the subject illustrated in FIG. 7 can be obtained. Here, in FIG. 8A, it is assumed that the frequency of the vertical stripes illustrated in FIG. 7 is sufficiently lower than the Nyquist frequency of the G1 filter and the G2 filter. In FIG. 8D, it is assumed that the frequency of the vertical stripes illustrated in FIG. 7 is higher than the frequency of the vertical stripes illustrated in FIG. 8A and is slightly lower than the Nyquist frequency of the G1 filter and the G2 filter. In FIG. 8G, it is assumed that the frequency of the vertical stripes illustrated in FIG. 7 is higher than the Nyquist frequency of the G1 filter and the G2 filter.

In FIGS. 8B, 8E, and 8H, only the G1sig in FIGS. 8A, 8D, and 8G is extracted, and interpolation of G1sig is performed on the pixels that do not correspond to the G1 filters by using surrounding G1sig. In FIGS. 8C, 8F, and 8I, only the G2sig in FIGS. 8A, 8D, and 8G is extracted, and interpolation of G2sig is performed on the pixels that do not correspond to the G2 filters by using surrounding G2sig.

As can be understood from FIGS. 8A to 8I, when the spatial frequency of a subject is sufficiently lower than the Nyquist frequency of the G1 filter and the G2 filter, the phase shift of G1sig and G2sig after interpolation is small. As the spatial frequency of the subject is more approximate to the Nyquist frequency of the G1 filter and the G2 filter, the phase shift of G1sig and G2sig after interpolation is large. When the spatial frequency exceeds the Nyquist frequency, the phases of G1sig and G2sig after interpolation are substantially reversed. That is, whether a region is a high-frequency region, that is, whether a region is a region where a false color occurs, can be determined by detecting a phase difference between G1sig and G2sig after interpolation.

Now, operation of the false color determining circuit 360 will be described with reference to FIGS. 9 and 10A to 10C.

Figure 9:
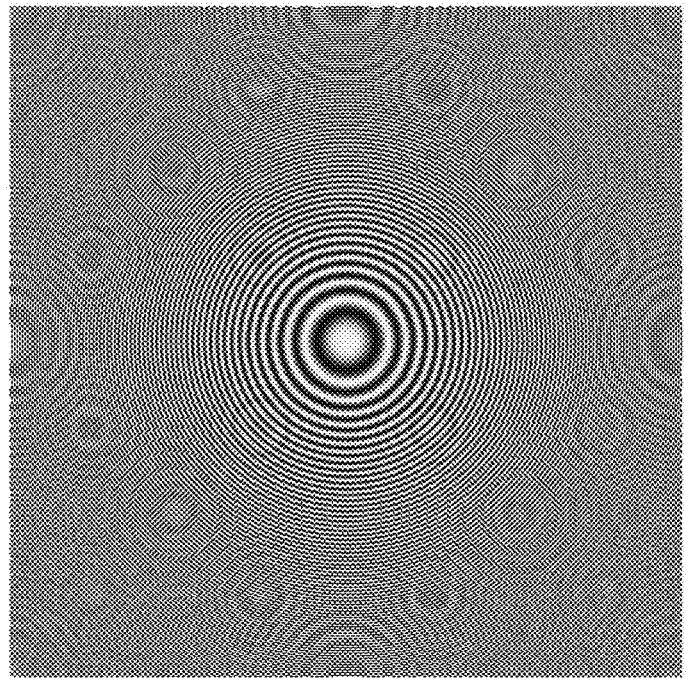
FIG. 9 is a diagram illustrating a circular zone plate (CZP).
Figure 10:
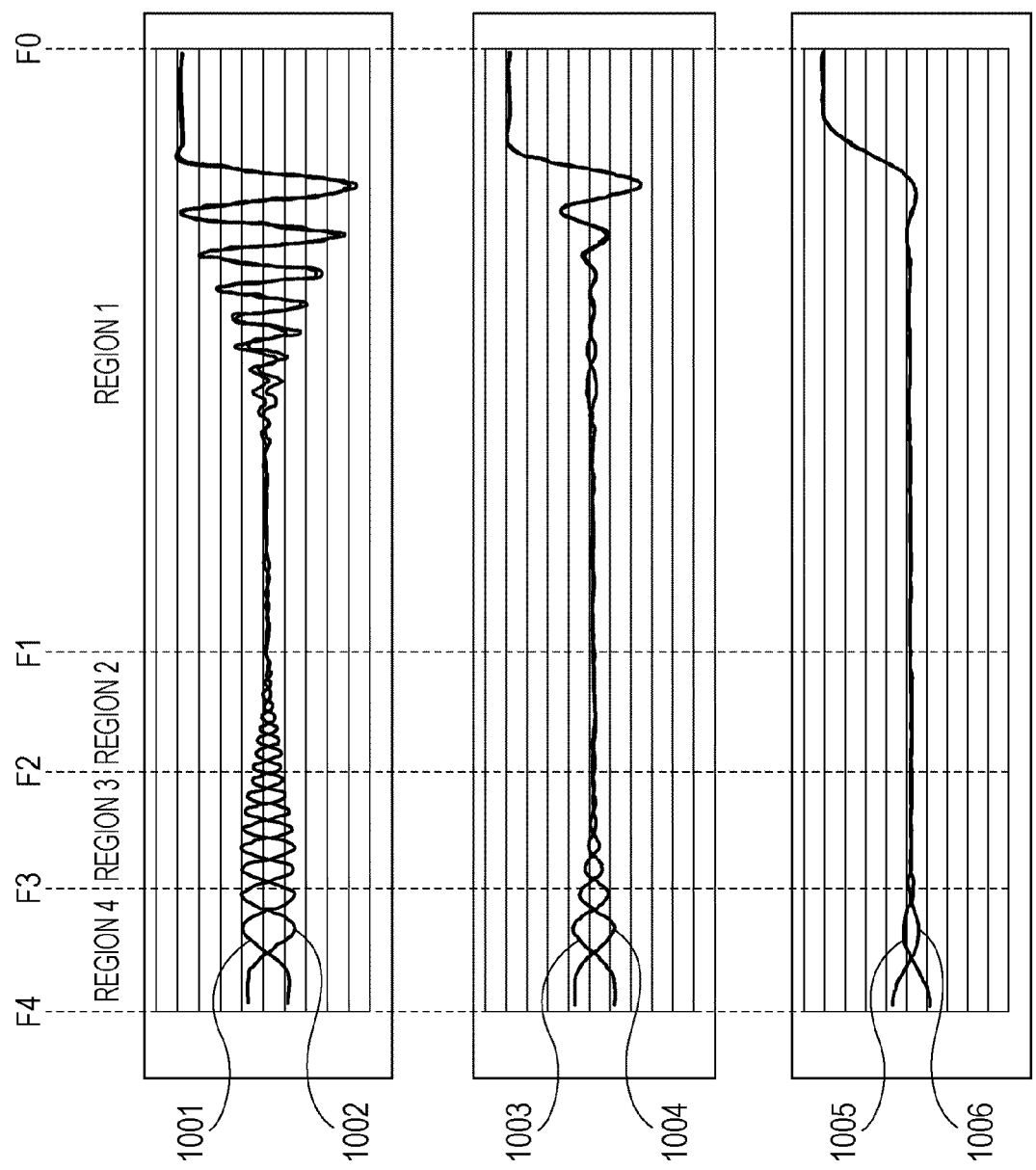
FIGS. 10A to 10C are diagrams illustrating values of G1sig and G2sig after interpolation positioned on an axis horizontally extending from the center of the CZP.

FIG. 9 is a diagram illustrating a circular zone plate (CZP), in which many concentric circles are arranged with the center of the image being the origin, and the spatial frequency increases from the center toward the outer side. FIGS. 10A to 10C illustrate plotted values of G1sig and G2sig after interpolation positioned on an axis that horizontally extends from the center of the CZP.

In FIG. 10A, a curve 1001 represents G1sig after interpolation of the image signal T01, and a curve 1002 represents G2sig after interpolation of the image signal T01. In FIG. 10B, a curve 1003 represents G1sig after interpolation of the image signal T02, and a curve 1004 represents G2sig after interpolation of the image signal T02. In FIG. 10C, a curve 1005 represents G1sig after interpolation of the image signal T03, and a curve 1006 represents G2sig after interpolation of the image signal T03. F0 to F4 represent spatial frequencies of the CZP. The spatial frequency at the center of the image is represented by F0, and the spatial frequency gradually increases toward the outer side of the image, in the order of F1, F2, F3, and F4.

The false color determining circuit 360 determines whether a region is a high-frequency region where a false-color signal occurs by using a difference in characteristic between the image signal of G1sig after interpolation and the image signal of G2sig after interpolation. Specifically, attention is focused on phases of slopes of the image signal of G1sig after interpolation and the image signal of G2sig after interpolation, and the region is determined to be a false-color region where a false-color signal occurs when the following expression (8) is satisfied.

$$\Delta G1h \times \Delta G2h < 0 \text{ or } \Delta G1v \times \Delta G2v < 0 \quad (8)$$

Figure 5A:
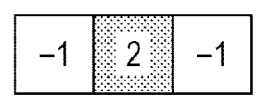
FIGS. 5A and 5B are diagrams illustrating an example of a digital filter.
Figure 5B:

Here, $\Delta G1h$ represents a slope in the horizontal direction of the image signal of G1sig after interpolation, and $\Delta G2h$ represents a slope in the horizontal direction of the image signal of G2sig after interpolation. Also, $\Delta G1v$ represents a slope in the vertical direction of the image signal of G1sig after interpolation, and $\Delta G2v$ represents a slope in the vertical direction of the image signal of G2sig after interpolation. For example, a slope in the horizontal direction can be obtained by using a known digital filter illustrated in FIG. 5A, and a slope in the vertical direction can be obtained by using a known digital filter illustrated in FIG. 5B. The filter for obtaining a slope is not limited thereto.

Alternatively, a false-color region may be determined in units of target regions, each composed of a plurality of pixels, not in units of pixels. In a case where determination is made in units of target regions, if the percentage of slopes of image signals that satisfy expression (8) among slopes of image signals obtained by using the individual pixels included in the region is equal to or higher than a threshold, the region may be determined to be a false-color region. Hereinafter, "target region" may be a region composed of a plurality of pixels or a region composed of a single pixel.

In this embodiment, it can be determined from FIG. 10A that the regions 2 to 4 where the spatial frequency in FIG. 9 is higher than F1 are false-color regions in the image signal T01. Also, it can be determined from FIG. 10B that the regions 3 and 4 where the spatial frequency in FIG. 9 is higher than F2 are false-color regions in the image signal T02. Furthermore, it can be determined from FIG. 10C that the region 4 where the spatial frequency in FIG. 9 is higher than F3 is a false-color region in the image signal T03.

The selecting circuit 320 selects the color-difference signal S11 that is generated from an image signal having the same frequency as the image signal T01 for the region 1 that is determined not to be a false-color region in the image signal T01. Also, the selecting circuit 320 selects the color-difference signal S12 that is generated from an image signal having the same frequency as the image signal T02 for the region 2 that is determined to be a false-color region in the image signal T01 and that is determined not to be a false-color region in the image signal T02. Also, the selecting circuit 320 selects the color-difference signal S13 that is generated from an image signal having the same frequency as the image signal T03 for the region 3 that is determined to be a false-color region in the image signal T02 and that is determined not to be a false-color region in the image signal T03. Also, the selecting circuit 320 selects the color-difference signal S14 that is generated from an image signal having a frequency lower than the image signal T03 for the region 4 that is determined to be a false-color region in the image signal T03. In this way, the selecting circuit 320 can select a color-difference signal not containing a false color in units of pixels.

In this embodiment, it is assumed that the frequency characteristic of the LPF 301 corresponds to that of the LPF 351, that the frequency characteristic of the LPF 302 corresponds to that of the LPF 352, and that the frequency characteristic of the LPF 303 corresponds to that of the LPF 353, but the present invention is not limited thereto.

For example, in order to increase the probability that a false color does not occur in the region that is determined not to be a false-color region in the image signal T01 in the image signal S01, the upper limit of the frequency included in the image signal S01 may be decreased to under the upper limit of the frequency included in the image signal T01. That is, the cutoff frequency of the LPF 351 is set to be slightly higher than the cutoff frequency of the LPF 301. Likewise, the cutoff frequency of the LPF 352 is set to be higher than the cutoff frequency of the LPF 302, and the cutoff frequency of the LPF 353 is set to be slightly higher than the cutoff frequency of the LPF 303. However, in such a case, regions with a decreased color resolution can increase compared to the case where the frequency characteristic of the LPF 301 corresponds to that of the LPF 351, the frequency characteristic of the LPF 302 corresponds to that of the LPF 352, and the frequency characteristic of the LPF 303 corresponds to that of the LPF 353.

In contrast, when regions with a decreased color resolution are to be decreased, the cutoff frequencies of the LPF 301, LPF 302, and LPF 303 may be set to be slightly lower than the cutoff frequencies of the corresponding LPF 351, LPF 352, and LPF 353. In this case, however, it is possible that a frequency higher than that of the image signal T01 is contained in the image signal S01. Thus, it is highly possible that the region that is determined not to be a false-color region in the image signal T01 is determined to be a false-color region in the image signal S01.

Whether the cutoff frequencies of the LPFs 301 to 303 are caused to correspond to the cutoff frequencies of the LPFs 351 to 353 or whether differences are provided therebetween may be adaptively changed depending on an image to be generated. Alternatively, the cutoff frequencies of those LPFs may be adaptively changed in accordance with a subject because the degree of effect of decreasing the resolution varies depending on the pattern of a subject.

As described above, according to this embodiment, the color-difference signal generating circuit 104 generates a plurality of image signals S01 to S04 that have passed through the LPFs 301 to 304 having different cutoff frequencies, and hierarchically generates color-difference signals S11 to S14 from the plurality of image signals S01 to S04. Then, the color-difference signal generating circuit 104 generates a plurality of image signals T01 to T03 that have passed through the LPFs 351 to 353 having different cutoff frequencies, and detects a false-color region in units of image signals of different layers. The selecting circuit 320 selects any of the color-difference signals S11 to S14 in accordance with the image signal of a resolution from which a false-color region has been detected among the image signals T01 to T03. Thus, the selecting circuit 320 is capable of selecting a color-difference signal that is generated from an image signal in a layer of the highest frequency in the range of preventing a false color in units of pixels or regions.

In this way, a color resolution is decreased by a necessary amount to suppress a false color only in a region where a false color occurs, and the necessity of decreasing a color resolution is eliminated in a region where a false color does not occur, so that both of an increase in color resolution and suppression of a false color can be realized with a good balance.

Figure 11:
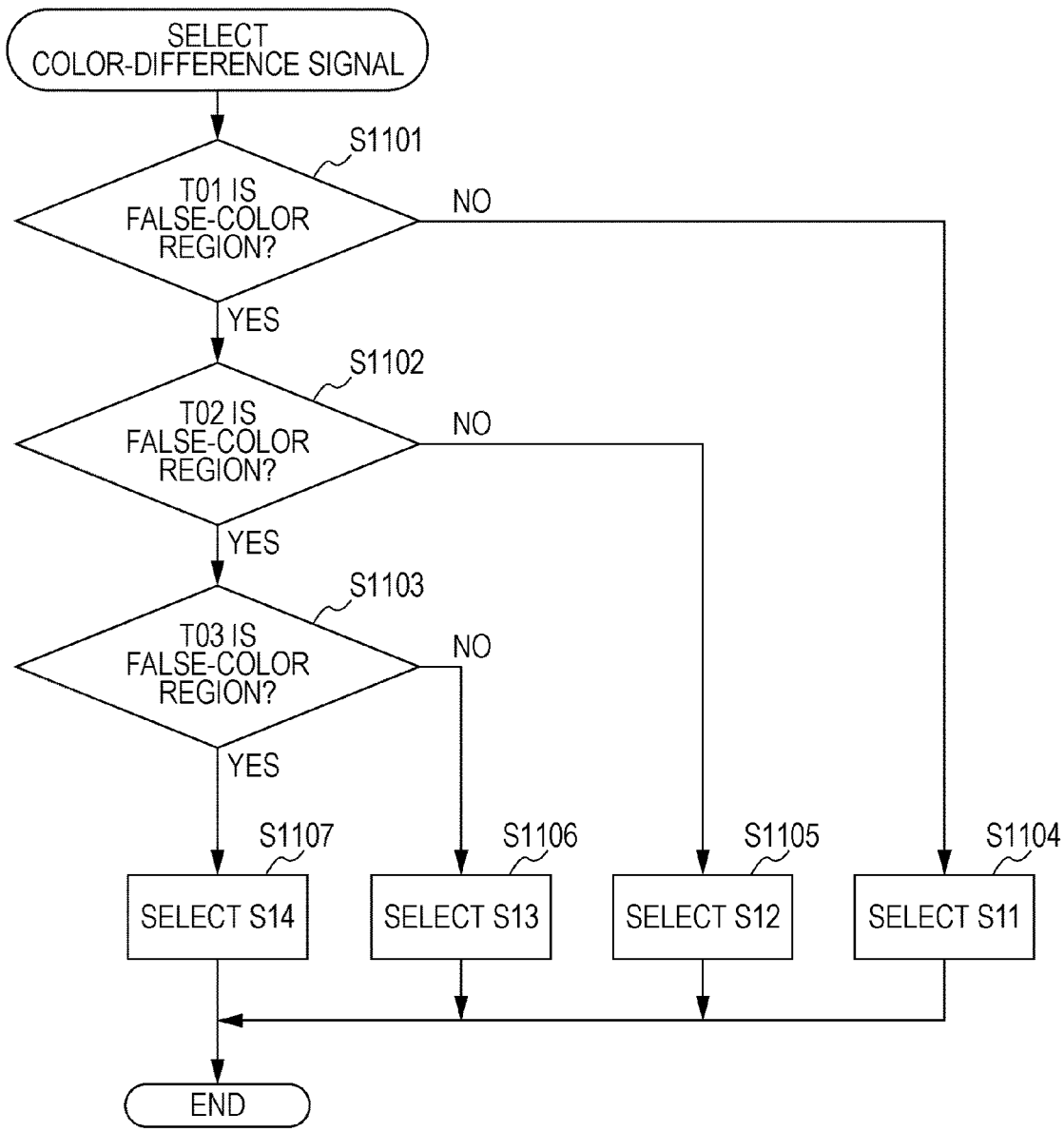
FIG. 11 is a flowchart illustrating a process of selecting a color-difference signal performed by a selecting circuit 320 according to the first embodiment of the present invention.

FIG. 11 is a flowchart illustrating a process of selecting a color-difference signal performed by the selecting circuit 320. The selecting circuit 320 performs the selection process in units of pixels or regions. Here, assume that the selecting circuit 320 performs the selection process in units of pixels.

In step S1101, the selecting circuit 320 determines whether the pixel of the image signal T01 corresponding to a target pixel is determined to be a false-color region by the false color determining circuit 360. If the target pixel is determined not to be a false-color region, the selecting circuit 320 proceeds to step S1104, where the selecting circuit 320 selects, as a color-difference signal of the target pixel, the color-difference signal S11 of the pixel corresponding to the target pixel.

If the target pixel is determined to be a false-color region in step S1101, the selecting circuit 320 proceeds to step S1102. In step S1102, the selecting circuit 320 determines whether the pixel of the image signal T02 corresponding to the target pixel is determined to be a false-color region by the false color determining circuit 360. If the target pixel is determined not to be a false-color region, the selecting circuit 320 proceeds to step S1105, where the selecting circuit 320 selects, as a color-difference signal of the target pixel, the color-difference signal S12 of the pixel corresponding to the target pixel.

If the target pixel is determined to be a false-color region in step S1102, the selecting circuit 320 proceeds to step S1103. In step S1103, the selecting circuit 320 determines whether the pixel of the image signal T03 corresponding to the target pixel is determined to be a false-color region by the false color determining circuit 360. If the target pixel is determined not to be a false-color region, the selecting circuit 320 proceeds to step S1106, where the selecting circuit 320 selects, as a color-difference signal of the target pixel, the color-difference signal S13 of the pixel corresponding to the target pixel.

If the target pixel is determined to be a false-color region in step S1103, the selecting circuit 320 proceeds to step S1107, where the selecting circuit 320 selects, as a color-difference signal of the target pixel, the color-difference signal S14 of the pixel corresponding to the target pixel.

Then, the selecting circuit 320 performs the color-difference signal selection process on all the pixels of the image signal to be output, and outputs color-difference signals R−G and B−G contained in any of the color-difference signals S11 to S14 selected for the respective pixels. Then, the output color-difference signals R−G and B−G are input to the color conversion matrix circuit 105 and are converted into signals R−Y and B−Y.

In this embodiment, expression (8) is used to determine whether a region is a false-color region, but the present invention is not limited thereto. For example, attention may be focused on the values of $\Delta G1h$, $\Delta G1v$, $\Delta G2h$, and $\Delta G2v$, and a region may be determined to be a false-color region if any of the following expressions (9) to (12) is satisfied. Also, the thresholds TH in these expressions may be different from each other in the image signals T01 to T03. With the adjustment of those values, a reference for determining a false-color region can be changed, and the balance between an increase in color resolution and suppression of a false color can be adjusted.

$$\Delta G1h - TH > 0 \text{ and } \Delta G2h + TH < 0 \tag{9}$$

$$\Delta G1h + TH < 0 \text{ and } \Delta G2h - TH > 0 \tag{10}$$

$$\Delta G1v - TH > 0 \text{ and } \Delta G2v + TH < 0 \tag{11}$$

$$\Delta G1v + TH < 0 \text{ and } \Delta G2v - TH > 0 \qquad (12)$$

(wherein TH>0)

Attention is focused on a slope in the horizontal direction and a slope in the vertical direction in order to determine whether a region is a false-color region. Alternatively, attention may be focused on a slope in an oblique direction.

Also, a slope of the image signal of G1sig after interpolation and a slope of the image signal of G2sig after interpolation are used to determine whether a region is a false-color region. Alternatively, a difference in value between G1sig and G2sig may be used. That is, if a difference in value between G1sig and G2sig is large, it can be determined that the phase shift is large. Specifically, even if any of expressions (8) to (12) is not satisfied, if the absolute value of the difference between G1sig and G2sig in a target pixel exceeds a threshold TH, as expressed in expression (13), the target pixel may be determined to be a false-color region.

$$|G1sig - G2sig| > TH \qquad (13)$$

(wherein TH>0)

However, if a luminance signal is small, both of the values of G1sig and G2sig are small. Thus, those thresholds may be changed in accordance with a luminance signal of the corresponding pixel generated by the luminance signal generating circuit 111.

Alternatively, in addition to a determination based on a slope of the image signal of G1sig after interpolation and a slope of the image signal of G2sig after interpolation, a determination based on a difference in value between G1sig and G2sig may be combined.

Furthermore, those determination conditions may be varied among the image signals T01 to T03.

Furthermore, whether a target pixel is a false-color region may be determined by considering a determination result of a false-color region of pixels around the target pixel, in addition to the target pixel.

In this embodiment, color-difference signals are generated from four-layer image signals, and a determination of a false-color region is performed in three-layer image signals, but the number of layers is not limited thereto. Color-difference signals may be generated from image signals of different frequencies in N+1 layers, and a determination of a false-color region may be performed in image signals of different frequencies in N layers.

In this embodiment, the color interpolation circuit 300 and the color interpolation circuit 350 are separated from each other, but one common circuit may be used if the characteristics thereof are common. Likewise, one common circuit may be used as the LPFs 301 to 303 and the LPFs 351 to 353 if the characteristics thereof are common.

In this embodiment, a description has been given of an example of selecting any of color-difference signals generated from image signals of different frequencies in a plurality of layers in order to suppress a false color, but the present invention is not limited thereto. In the same method as that described above, luminance signals may be generated from image signals of different frequencies in N+1 layers, and a moire region instead of a false-color region may be detected in the same method with respect to image signals of different frequencies in N layers, whereby moire due to luminance signals can be suppressed. That is, this embodiment is effective to moire due to luminance as well as a false color due to color signals. Furthermore, if the process according to this embodiment is performed on image signals on which a resizing process of reducing the number of pixels is performed, moire or a false color that is caused by the resizing process can be suppressed.

As described above, the image processing apparatus according to this embodiment extracts an image signal of a G1 filter serving as a first color filter and an image signal of a G2 filter serving as a second color filter from an image signal obtained from the image pickup device in a Bayer pattern, and performs interpolation. The pixels corresponding to the G1 filter and the G2 filter are arranged in the same cycles, and the spatial phases thereof are shifted. Thus, the phases of the image signal of the G1 filter after interpolation and the image signal of the G2 filter after interpolation are reversed in a high-frequency region, as illustrated in FIGS. 8A to 8I and FIGS. 10A to 10C. Thus, the image processing apparatus is capable of determining whether a target region (target pixel) is a high-frequency region on the basis of at least one of slopes of the image signals of the G1 filter and the G2 filter and the difference between the image signals of the G1 filter and the G2 filter. If it is determined that the target pixel is a high-frequency region, the image processing apparatus generates predetermined signals, such as color-difference signal and luminance signals, from image signals in which the cutoff frequency is decreased to the level where the target pixel is not determined to be a high-frequency region, thereby being capable of suppressing a false color and moire.

Alternatively, the image processing apparatus may cause an apparatus in the subsequent stage to generate the predetermined signals, such as color-difference signals and luminance signals, and may set a flag representing a determination result of whether the target pixel is a high-frequency region in an image signal.

Second Embodiment

A second embodiment is different from the first embodiment in that whether a target pixel is an edge region is also determined when the selecting circuit 320 selects a color-difference signal. In the first embodiment, if the false color determining circuit 360 determines that a target region is a false-color region, the selecting circuit 320 selects a color-difference signal generated from an image signal of a lower frequency. As a result, if the region determined to be a false-color region is an edge region, it is possible that the color in the edge region runs.

The configuration of the image processing apparatus according to this embodiment is similar to that of the image processing apparatus according to the first embodiment, and thus the description thereof is omitted. In this embodiment, part of the configuration of the color-difference signal generating circuit 104 illustrated in FIG. 1 is different from the first embodiment.

Figure 12:
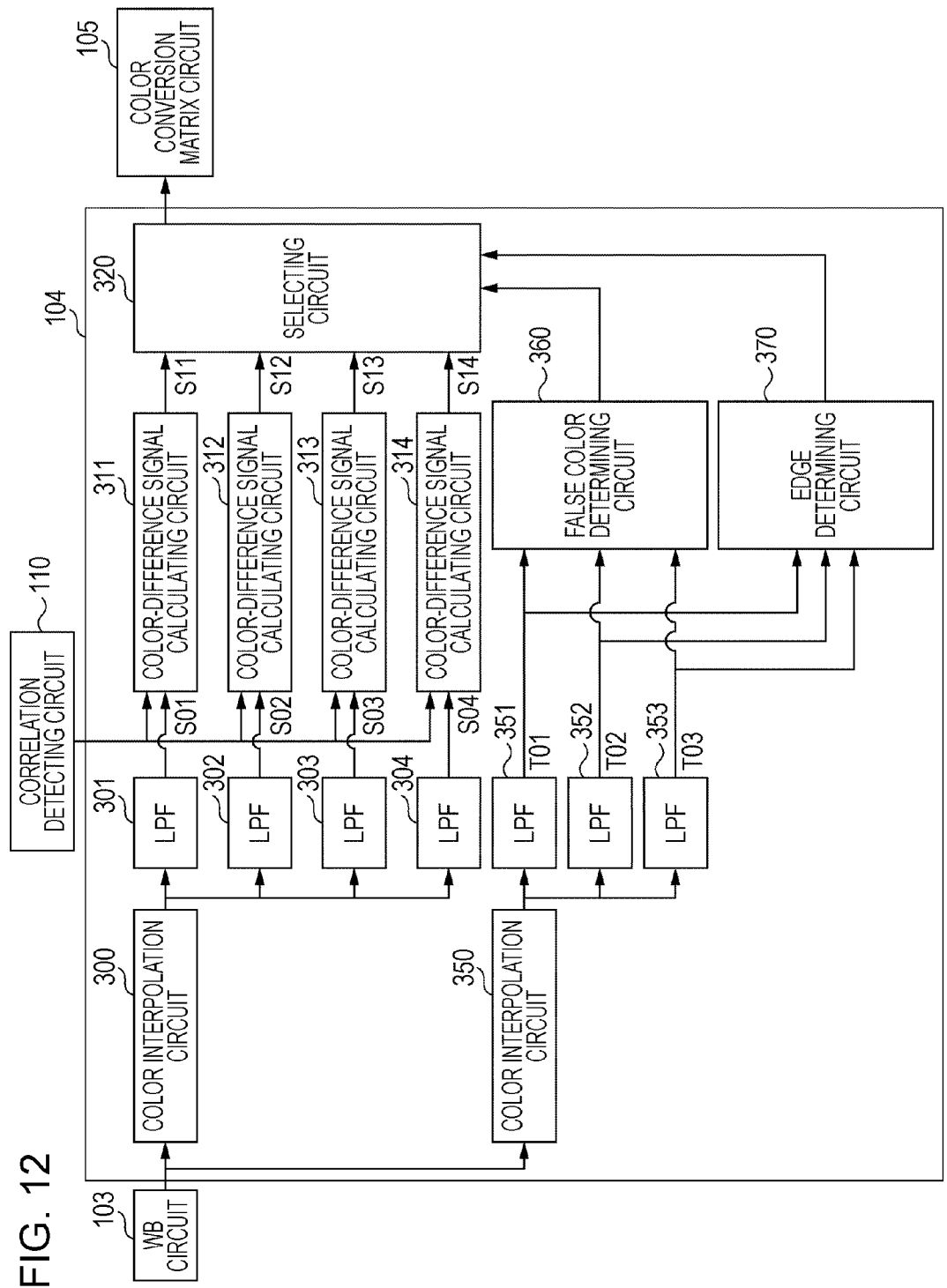
FIG. 12 is a block diagram illustrating a configuration of a color-difference signal generating circuit 104 according to a second embodiment of the present invention.

FIG. 12 is a block diagram illustrating a configuration of the color-difference signal generating circuit 104 according to this embodiment. The color-difference signal generating circuit 104 according to this embodiment includes an edge determining circuit 370 that receives image signals T01 to T03 output from the LPFs 351 to 353, in addition to the configuration of the color-difference signal generating circuit illustrated in FIG. 3. A determination result about an edge region generated by the edge determining circuit 370 is input to the selecting circuit 320.

The edge determining circuit 370 calculates Gsig in all the pixels on the basis of an image signal of G1 and an image signal of G2 contained in an image signal T01 output from the LPF 351 by using expression (14).

$$Gsig = (G1sig + G2sig)/2 \qquad (14)$$

Then, attention is focused on slopes in the horizontal direction and the vertical direction of the image signal of Gsig. A target pixel is determined to be an edge region if the following expression (15) is satisfied, and the determination result is output to the selecting circuit 320.

$$\Delta Gh > TH \text{ or } \Delta Gv > TH \qquad (15)$$

Here, $\Delta Gh$ represents a slope in the horizontal direction of the image signal of Gsig after interpolation, and $\Delta Gv$ represents a slope in the horizontal direction of the image signal of G2sig after interpolation. Those slopes can be obtained through a known digital filter illustrated in FIG. 5A in the horizontal direction and a known digital filter illustrated in FIG. 5B in the vertical direction. The filters for obtaining slopes are not limited thereto. Alternatively, an edge region may be determined in units of regions, each composed of a plurality of pixels, not in units of pixels. In a case where determination is made in units of regions, if the percentage of slopes of image signals that satisfy expression (15) among slopes of image signals obtained by using the individual pixels included in the region is equal to or higher than a threshold, the region may be determined to be an edge region.

Likewise, the edge determining circuit 370 makes a determination of an edge region on the image signal T02 output from the LPF 352 and the image signal T03 output from the LPF 353.

An example of using Gsig based on G1sig and G2sig has been described as a method for determining an edge region. Alternatively, a luminance signal generated from Rsig, Gsig, and Bsig by using expression (7) may also be used.

The false color determining circuit 360 performs a determination of a false-color region in a process similar to that of the first embodiment, and outputs the determination result to the selecting circuit 320.

Figure 13:
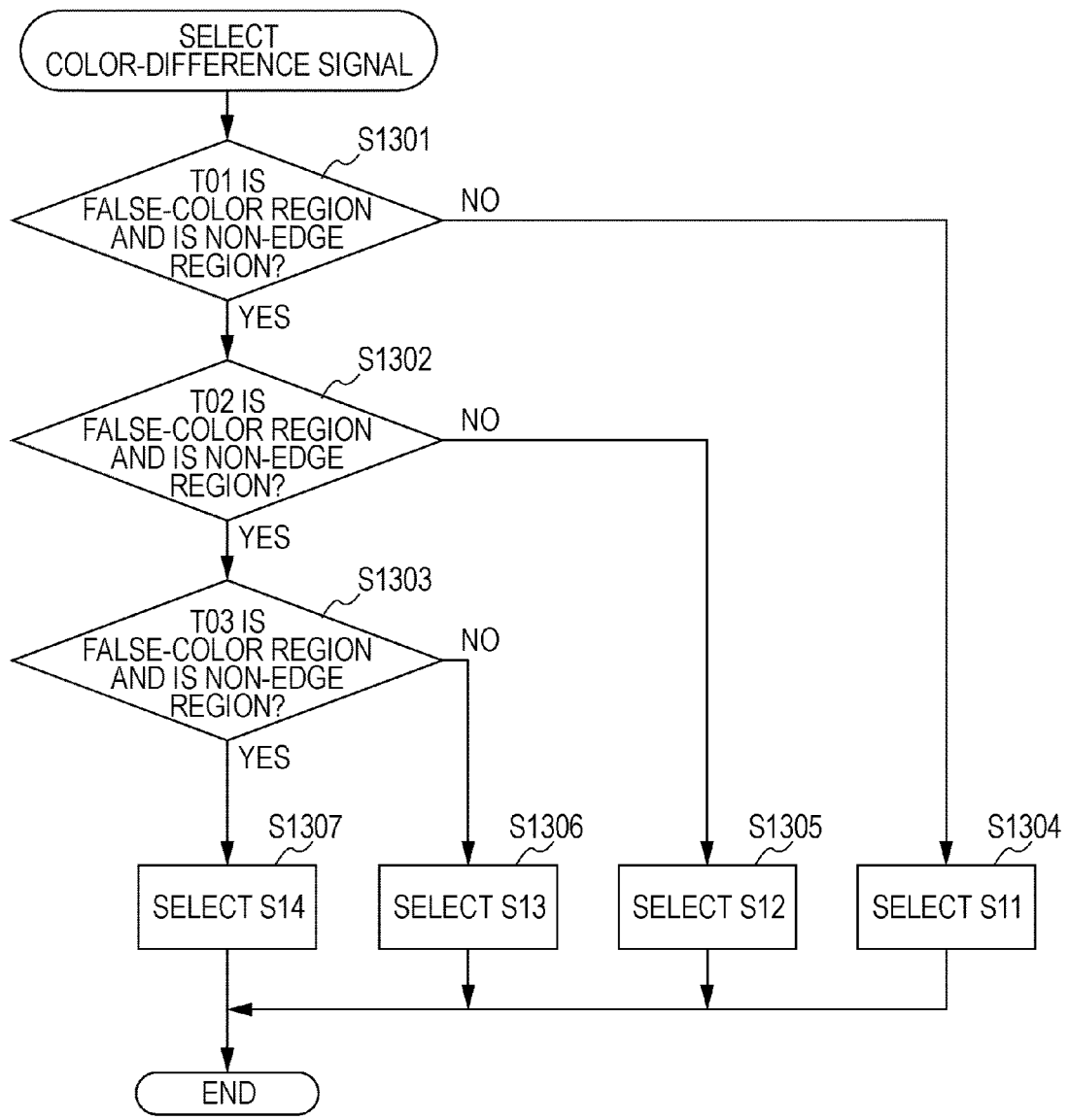
FIG. 13 is a flowchart illustrating a process of selecting a color-difference signal performed by a selecting circuit 320 according to the second embodiment of the present invention.

FIG. 13 is a flowchart illustrating a process of selecting a color-difference signal performed by the selecting circuit 320 according to this embodiment. The selecting circuit 320 performs the selection process in units of pixels or regions. Here, assume that the selecting circuit 320 performs the selection process in units of pixels.

In step S1301, the selecting circuit 320 determines whether the pixel of the image signal T01 corresponding to a target pixel is determined to be a false-color region by the false color determining circuit 360 and is determined not to be an edge region by the edge determining circuit 370. If the pixel is determined not to be a false-color region by the false color determining circuit 360, the selecting circuit 320 proceeds to step S1304 to select, as a color-difference signal of the target pixel, the color-difference signal S11 of the pixel corresponding to this target pixel. Also, if the pixel is determined to be an edge region by the edge determining circuit 370, the selecting circuit 320 proceeds to step S1304 to select, as a color-difference signal of the target pixel, the color-difference signal S11 of the pixel corresponding to this target pixel. That is, even if the target pixel is determined to be a false-color region, if the target pixel is determined to be an edge region, the selecting circuit 320 selects the color-difference signal S11 in order to put high priority on suppressing run of color in the edge region.

If the pixel is determined to be a false-color region by the false color determining circuit 360 and if the pixel is determined not to be an edge region by the edge determining circuit 370, the selecting circuit 320 proceeds to step S1302. In step S1302, the selecting circuit 320 determines whether the pixel of the image signal T02 corresponding to the target pixel is determined to be a false-color region by the false color determining circuit 360 and is determined not to be an edge region by the edge determining circuit 370. If the pixel is determined not to be a false-color region by the false color determining circuit 360, the selecting circuit 320 proceeds to step S1305 to select, as a color-difference signal of the target pixel, the color-difference signal S12 of the pixel corresponding to this target pixel. Also, if the pixel is determined to be an edge region by the edge determining circuit 370, the selecting circuit 320 proceeds to step S1305 to select, as a color-difference signal of the target pixel, the color-difference signal S12 of the pixel corresponding to this target pixel. That is, even if the target pixel is determined to be a false-color region, if the target pixel is determined to be an edge region, the selecting circuit 320 selects the color-difference signal S12 in order to put high priority on suppressing run of color in the edge region.

If the pixel is determined to be a false-color region by the false color determining circuit 360 and if the pixel is determined not to be an edge region by the edge determining circuit 370, the selecting circuit 320 proceeds to step S1303. In step S1303, the selecting circuit 320 determines whether the pixel of the image signal T03 corresponding to the target pixel is determined to be a false-color region by the false color determining circuit 360 and is determined not to be an edge region by the edge determining circuit 370. If the pixel is determined not to be a false-color region by the false color determining circuit 360, the selecting circuit 320 proceeds to step S1306 to select, as a color-difference signal of the target pixel, the color-difference signal S13 of the pixel corresponding to this target pixel. Also, if the pixel is determined to be an edge region by the edge determining circuit 370, the selecting circuit 320 proceeds to step S1306 to select, as a color-difference signal of the target pixel, the color-difference signal S13 of the pixel corresponding to this target pixel. That is, even if the target pixel is determined to be a false-color region, if the target pixel is determined to be an edge region, the selecting circuit 320 selects the color-difference signal S13 in order to put high priority on suppressing run of color in the edge region.

In contrast, if the pixel is determined to be a false-color region by the false color determining circuit 360 and is determined not to be an edge region by the edge determining circuit 370, the selecting circuit 320 proceeds to step S1307 to select the color-difference signal S14.

As described above, in this embodiment, even if a region is determined to be a false-color region by the false color determining circuit 360, if the region is an edge region, the selecting circuit 320 selects a color-difference signal that is generated from an image signal in a layer of a higher frequency than in a case where the region is not an edge region.

In this way, the effect obtained in the configuration according to the first embodiment can be obtained, and also run of color in an edge region can be suppressed.

Third Embodiment

A third embodiment is difference from the first embodiment in that the color-difference signal generating circuit 104 does not output any of the color-difference signals S11 to S14 but outputs a color-difference signal that is generated by combining those color-difference signals S11 to S14.

The configuration of the image processing apparatus according to this embodiment is similar to that of the image processing apparatus according to the first embodiment, and thus the description thereof is omitted. In this embodiment, part of the configuration of the color-difference signal generating circuit 104 in FIG. 1 is different from the first embodiment.

Figure 14:
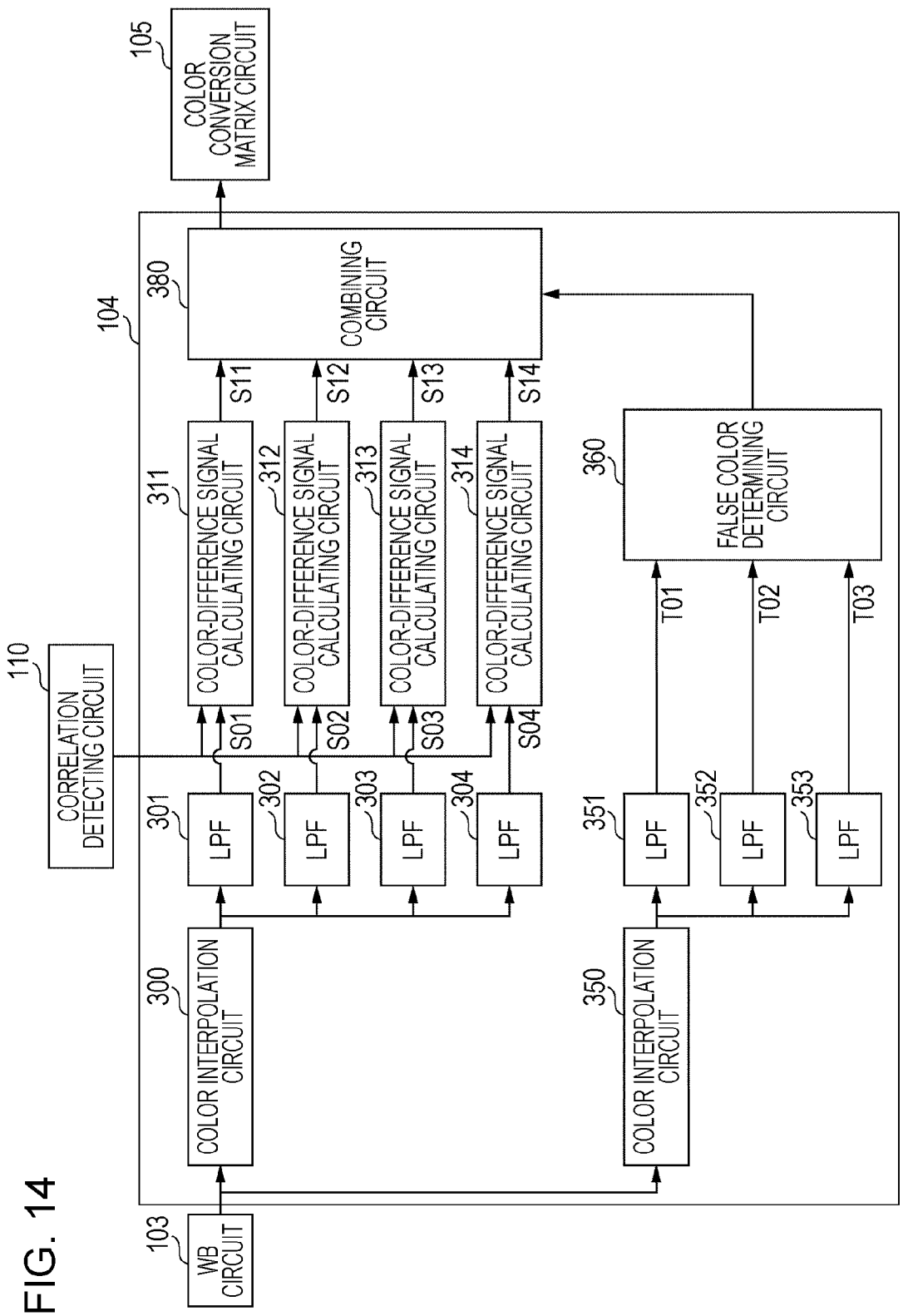
FIG. 14 is a block diagram illustrating a configuration of a color-difference signal generating circuit 104 according to a third embodiment of the present invention.

FIG. 14 is a block diagram illustrating a configuration of the color-difference signal generating circuit 104 according to this embodiment. The color-difference signal generating circuit 104 according to this embodiment includes a combining circuit 380, instead of the selecting circuit 320 illustrated in FIG. 3.

Figure 15:
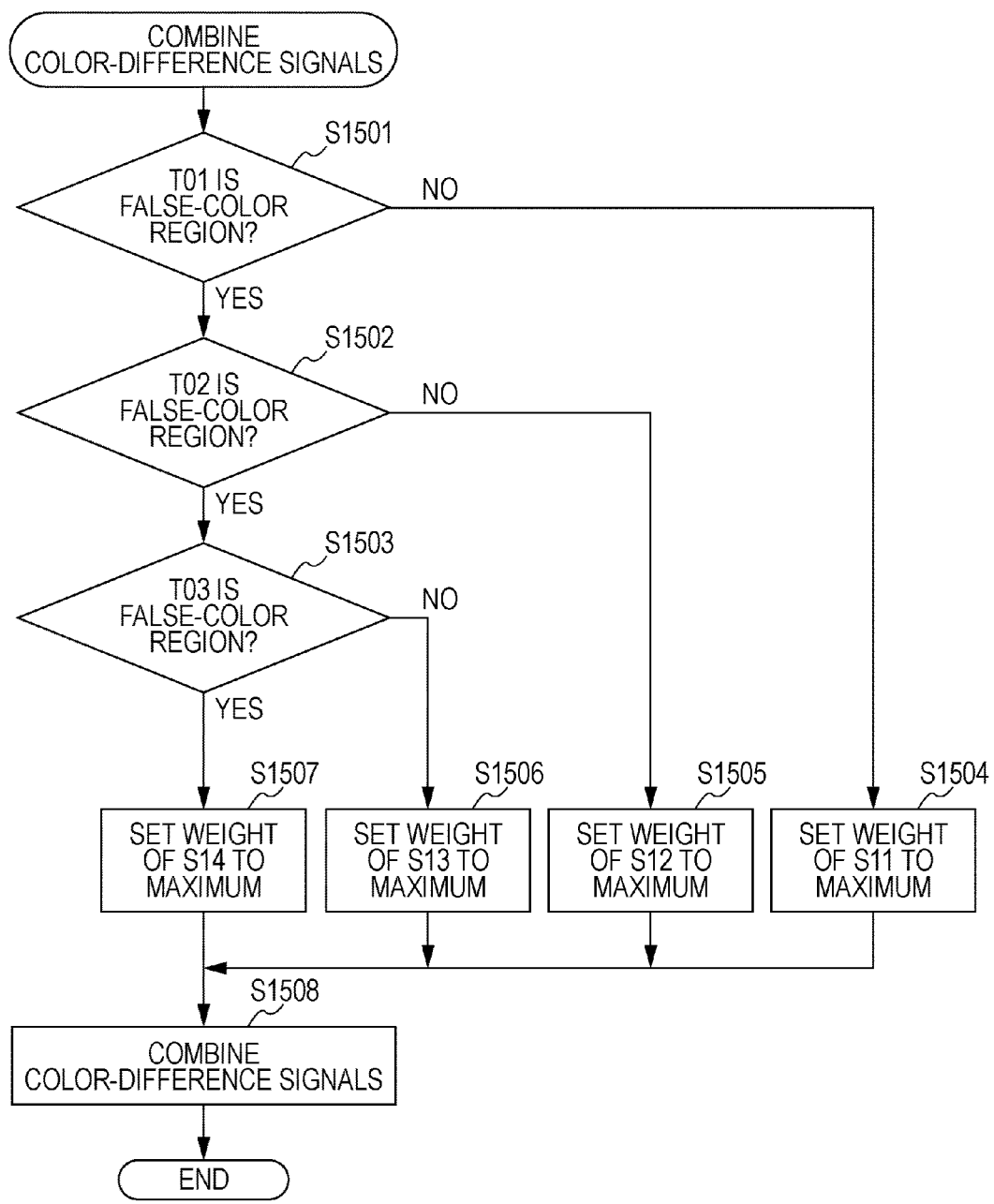
FIG. 15 is a flowchart illustrating a process of combining color-difference signals performed by a combining circuit 380 according to the third embodiment of the present invention.

FIG. 15 is a flowchart illustrating a process of combining color-difference signals performed by the combining circuit 380 according to this embodiment. The combining circuit 380 performs the combining process in units of pixels or regions. Here, assume that the combining circuit 380 performs the combining process in units of pixels. The combining circuit 380 changes weights of the color-difference signals S11 to S14 in accordance with the image signal among the image signals T01 to T03 in which a false-color region is detected, combines the color-difference signals S11 to S14, and outputs the resulted signal.

In step S1501, the combining circuit 380 determines whether the pixel of the image signal T01 corresponding to a target pixel is determined to be a false-color region by the false color determining circuit 360. If the pixel is determined not to be a false-color region by the false color determining circuit 360, the combining circuit 380 proceeds to step S1504 to set the weight of the color-difference signal S11 of the pixel corresponding to the target pixel to be the maximum with respect to the weights of the other color-difference signals.

If the pixel is determined to be a false-color region by the false color determining circuit 360 in step S1501, the combining circuit 380 proceeds to step S1502. In step S1502, the combining circuit 380 determines whether the pixel of the image signal T02 corresponding to the target pixel is determined to be a false-color region by the false color determining circuit 360. If the pixel is determined not to be a false-color region by the false color determining circuit 360, the combining circuit 380 proceeds to step S1505 to set the weight of the color-difference signal S12 of the pixel corresponding to the target pixel to be the maximum with respect to the weights of the other color-difference signals.

If the pixel is determined to be a false-color region by the false color determining circuit 360 in step S1502, the combining circuit 380 proceeds to step S1503. In step S1503, the combining circuit 380 determines whether the pixel of the image signal T03 corresponding to the target pixel is determined to be a false-color region by the false color determining circuit 360. If the pixel is determined not to be a false-color region by the false color determining circuit 360, the combining circuit 380 proceeds to step S1506 to set the weight of the color-difference signal S13 of the pixel corresponding to the target pixel to be the maximum with respect to the weights of the other color-difference signals.

In contrast, if the pixel is determined to be a false-color region by the false color determining circuit 360, the combining circuit 380 proceeds to step S1507 to set the weight of the color-difference signal S14 of the pixel corresponding to the target pixel to be the maximum with respect to the weights of the other color-difference signals.

The combining circuit 380 combines the color-difference signals S11 to S14 in accordance with the weights set in steps S1504 to S1507 by using any of the following expressions.

$$(R-G, B-G) = (6 \times S11 + 2 \times S12 + S13 + S14)/10 \quad (16)$$

$$(R-G, B-G) = (2 \times S11 + 5 \times S12 + 2 \times S13 + S14)/10 \quad (17)$$

$$(R-G, B-G) = (S11 + 2 \times S12 + 5 \times S13 + 2 \times S14)/10 \quad (18)$$

$$(R-G, B-G) = (S11 + S12 + 2 \times S13 + 6 \times S14)/10 \quad (19)$$

If the weight of the color-difference signal S11 is set to be the maximum, the combining circuit 380 selects expression (16). Likewise, if the weights of the color-difference signals S12, S13, and S14 are set to be the maximum, the combining circuit 380 selects expression (17), expression (18), and expression (19), respectively. Then, the combining circuit 380 outputs color-difference signals R–G and B–G obtained through this combining process to the color conversion matrix circuit 105.

As in the second embodiment, whether a target pixel is an edge region may be taken into consideration. That is, even if the target pixel is determined to be a false-color region, if the target pixel is determined to be an edge region, the weight of the color-difference signal that is generated from the image signal having the highest cutoff frequency among image signals determined to be an edge region may be set to the maximum.

In addition, the combining circuit 380 may change the weights of the color-difference signals S11 to S14 in accordance with the degree of false color detected from the image signals T01 to T03. The degree of false color can be obtained from $\Delta G1$ h, $\Delta G1$ v, $\Delta G2$ h, and $\Delta G2$ v obtained from G1sig after interpolation and G2sig after interpolation, and a difference in value between G1sig and G2sig. That is, the combining circuit 380 sets the degree of false color to a large value so that the phase shift of G1sig after interpolation and G2sig after interpolation is estimated to be approximately 180 degrees. Also, the combining circuit 380 is capable of setting the weights of the color-difference signals S11 to S14 in accordance with the degree of false color of the image signals T01 to T03.

Other Embodiments

An object of the present invention is also achieved by the following method. That is, a storage medium (or recording medium) storing a software program code that realizes the functions of the above-described embodiments is supplied to a system or an apparatus. Then, a computer (or CPU or MPU) of the system or the apparatus reads and executes the program code stored in the storage medium. In this case, the program code itself read from the storage medium realizes the functions of the above-described embodiments, and the storage medium storing the program code constitutes the present invention. Also, the following case is included in the present invention in addition to the case where the functions of the above-described embodiments are realized when the computer executes the read program code. That is, an operating system (OS) that operates in the computer performs part or whole of actual processes on the basis of an instruction of the program code, and the functions of the above-described embodiments are realized by the processes.

Furthermore, the following case is included in the present invention. That is, the program code read from the storage medium is written on a memory provided in a function expansion card inserted into the computer or a function expansion unit connected to the computer. Then, the CPU or the like provided in the function expansion card or the function expansion unit performs part or whole of actual processes on the basis of an instruction of the program code, and the functions of the above-described embodiments are realized by the processes.

In a case where the present invention is applied to the above-described storage medium, the program code corresponding to the above-described procedure is stored in the storage medium.

According to the present invention, an image processing apparatus capable of increasing an effect of suppressing a false color and moire that occur in a high-frequency region can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Application No. PCT/JP2009/067741, filed Oct. 13, 2009, which is hereby incorporated by reference herein in its entirety.

The invention claimed is:

1. An image processing apparatus comprising:
   an interpolation unit configured to separate an image signal obtained from an image pickup device, in which a plurality of color filters are arranged in a predetermined pattern and in which pixels corresponding to the respective color filters are provided, into image signals of the respective color filters, and to perform an interpolation process by using the image signals of the respective color filters;
   a determination unit configured to determine whether a target region is a high-frequency region on the basis of at least any of the slopes of image signals of a first color filter and a second color filter among the plurality of color filters and a difference between the image signals of the first color filter and the second color filter in the target region;
   an extraction unit configured to extract image signals having different cutoff frequencies from the image signal obtained from the image pickup device; and
   a processing unit configured to perform image processing if the target region is determined to be a high-frequency region by the determination unit, the image processing being different from image processing that is performed if the target region is not determined to be a high-frequency region,
   wherein pixels corresponding to the first color filter and the second color filter are arranged with an identical period and with a spatial phase difference, and
   wherein the processing unit generates and outputs a predetermined signal in the target region, and, if the target region is determined to be a high-frequency region by the determination unit, outputs a predetermined signal generated from an image signal having a cutoff frequency lower than in a case where the target region is not determined to be a high-frequency region.

2. The image processing apparatus according to claim 1, wherein the determination unit determines that the target region is a high-frequency region if signs of the slope of the image signal of the first color filter and the slope of the image signal of the second color filter are inverted in the target region.

3. The image processing apparatus according to claim 1, wherein the determination unit determines that the target region is a high-frequency region if signs of the slope of the image signal of the first color filter and the slope of the image signal of the second color filter are inverted and if a level of the slope of the image signal of the first color filter and a level of the slope of the image signal of the second color filter exceed a threshold in the target region.

4. The image processing apparatus according to claim 1, wherein the determination unit determines that the target region is a high-frequency region if the difference between the image signal of the first color filter and the image signal of the second color filter exceeds a threshold in the target region.

5. The image processing apparatus according to claim 1, wherein the first color filter and the second color filter are color filters corresponding to an identical color.

6. The image processing apparatus according to claim 5, wherein the image pickup device includes red, blue, and green color filters arranged in a Bayer pattern, wherein the first color filter is a green color filter that is arranged in a horizontal direction with respect to the red color filter and that is arranged in a vertical direction with respect to the blue color filter, and wherein the second color filter is a green color filter that is arranged in a vertical direction with respect to the red color filter and that is arranged in a horizontal direction with respect to the blue color filter.

7. The image processing apparatus according to claim 1, wherein the processing unit determines whether the target region is determined to be a high-frequency region by the determination unit with respect to the respective image signals having different cutoff frequencies extracted by the extraction unit, and outputs a predetermined signal generated from an image signal having a cutoff frequency corresponding to an image signal having a highest cutoff frequency among image signals in which the target region is not determined to be a high-frequency region.

8. The image processing apparatus according to claim 1, further comprising:
   a detection unit configured to determine whether the target region is an edge region, wherein the processing unit determines whether the target region is determined to be a high-frequency region by the determination unit and whether the target region is determined to be an edge region by the detection unit with respect to the respective image signals having different cutoff frequencies extracted by the extraction unit, and, if the target region is determined to be an edge region in any of the image signals having different cutoff frequencies, outputs a predetermined signal generated from an image signal having a cutoff frequency corresponding to an image signal having a highest cutoff frequency among image signals in which the target region is determined to be an edge region.

9. An image processing apparatus comprising:
   an interpolation unit configured to separate an image signal obtained from an image pickup device, in which a plurality of color filters are arranged in a predetermined pattern and in which pixels corresponding to the respective color filters are provided, into image signals of the respective color filters, and to perform an interpolation process by using the image signals of the respective color filters;
   a determination unit configured to determine whether a target region is a high-frequency region on the basis of at least any of the slopes of image signals of a first color filter and a second color filter among the plurality of color filters and a difference between the image signals of the first color filter and the second color filter in the target region;
   an extraction unit configured to extract image signals having different cutoff frequencies from the image signal obtained from the image pickup device; and
   a processing unit configured to perform image processing if the target region is determined to be a high-frequency region by the determination unit, the image processing being different from image processing that is performed if the target region is not determined to be a high-frequency region, wherein pixels corresponding to the first color filter and the second color filter are arranged with an identical period and with a spatial phase difference, and wherein the processing unit generates and outputs a predetermined signal in the target region, and, if the target region is determined to be a high-frequency region by the determination unit, increases a weight of a predetermined signal generated from an image signal having a cutoff frequency lower than in a case where the target region is not determined to be a high-frequency region, and combines predetermined signals generated from the image signals having different cutoff frequencies to output a result signal.

10. The image processing apparatus according to claim 9, wherein the processing unit determines whether the target region is determined to be a high-frequency region by the determination unit with respect to the respective image signals having different cutoff frequencies extracted by the extraction unit, and performs combining by setting a weight of a predetermined signal generated from an image signal having a cutoff frequency corresponding to an image signal having a highest cutoff frequency among image signals in which the target region is not determined to be a high-frequency region to be larger than a weight of a predetermined signal generated from an image signal having another cutoff frequency.

11. The image processing apparatus according to claim 9, further comprising:
a detection unit configured to determine whether the target region is an edge region, wherein the processing unit determines whether the target region is determined to be a high-frequency region by the determination unit and whether the target region is determined to be an edge region by the detection unit with respect to the respective image signals having different cutoff frequencies extracted by the extraction unit, and, if the target region is determined to be an edge region in any of the image signals having different cutoff frequencies, performs combining by setting a weight of a predetermined signal generated from an image signal having a cutoff frequency corresponding to an image signal having a highest cutoff frequency among image signals in which the target region is determined to be an edge region to be larger than a weight of a predetermined signal generated from an image signal having another cutoff frequency.

12. The image processing apparatus according to claim 1 or claim 9, wherein the predetermined signal is a color-difference signal.

13. The image processing apparatus according to claim 1 or claim 9, wherein the predetermined signal is a luminance signal.

14. An image processing method comprising:
separating an image signal obtained from an image pickup device, in which a plurality of color filters are arranged in a predetermined pattern and in which pixels corresponding to the respective color filters are provided, into image signals of the respective color filters;
performing interpolation by using the image signals of the respective color filters;
determining whether a target region is a high-frequency region on the basis of at least any of the slopes of image signals of a first color filter and a second color filter among the plurality of color filters and a difference between the image signals of the first color filter and the second color filter in the target region;
extracting image signals having different cutoff frequencies from the image signal obtained from the image pickup device; and
performing image processing if the target region is determined to be a high-frequency region, the image processing being different from image processing that is performed if the target region is not determined to be a high-frequency region,
wherein pixels corresponding to the first color filter and the second color filter are arranged with an identical period and with a spatial phase difference, and
wherein performing image processing includes generating and outputting a predetermined signal in the target region, and, if the target region is determined to be a high-frequency region, outputting a predetermined signal generated from an image signal having a cutoff frequency lower than in a case where the target region is not determined to be a high-frequency region.

15. A non-transitory computer-readable recording medium that stores a program causing a computer of an image processing apparatus to execute the image processing method according to claim 14.

16. An image processing method comprising:
separating an image signal obtained from an image pickup device, in which a plurality of color filters are arranged in a predetermined pattern and in which pixels corresponding to the respective color filters are provided, into image signals of the respective color filters;
performing interpolation by using the image signals of the respective color filters;
determining whether a target region is a high-frequency region on the basis of at least any of the slopes of image signals of a first color filter and a second color filter among the plurality of color filters and a difference between the image signals of the first color filter and the second color filter in the target region;
extracting image signals having different cutoff frequencies from the image signal obtained from the image pickup device; and
performing image processing if the target region is determined to be a high-frequency region, the image processing being different from image processing that is performed if the target region is not determined to be a high-frequency region,
wherein pixels corresponding to the first color filter and the second color filter are arranged with an identical period and with a spatial phase difference, and
wherein performing image processing includes generating and outputting a predetermined signal in the target region, and, if the target region is determined to be a high-frequency region, increasing a weight of a predetermined signal generated from an image signal having a cutoff frequency lower than in a case where the target region is not determined to be a high-frequency region, and combining predetermined signals generated from the image signals having different cutoff frequencies to output a result signal.

17. A non-transitory computer-readable recording medium that stores a program causing a computer of an image processing apparatus to execute the image processing method according to claim 16.

* * * * *